United States Patent [19]

Iijima

[11] Patent Number: 5,384,454
[45] Date of Patent: Jan. 24, 1995

[54] PORTABLE ELECTRONIC APPARATUS

[75] Inventor: Yasuo Iijima, Yokohama, Japan

[73] Assignee: Kabushiki Kaisha Toshiba, Kawasaki, Japan

[21] Appl. No.: 26,425

[22] Filed: Mar. 4, 1993

[30] Foreign Application Priority Data

Mar. 6, 1992 [JP] Japan ................... 4-049586

[51] Int. Cl.6 .......... G06K 19/06; G06F 17/60
[52] U.S. Cl. ........................... 235/492
[58] Field of Search ............... 235/492, 380

[56] References Cited

U.S. PATENT DOCUMENTS

| | | | |
|---|---|---|---|
| 4,734,568 | 3/1988 | Watanabe | 235/487 |
| 4,734,569 | 3/1988 | Kawana et al. | 235/487 |
| 4,816,653 | 3/1989 | Anderl et al. | 235/492 |
| 4,853,522 | 8/1989 | Ogasawara | 235/492 |
| 4,891,506 | 1/1990 | Yoshimatsu | 235/492 |
| 4,928,001 | 5/1990 | Masada | 235/492 |
| 4,985,615 | 1/1991 | Iijima | 235/492 |
| 4,988,855 | 1/1991 | Iijima | 235/492 |

Primary Examiner—John Shepperd
Attorney, Agent, or Firm—Cushman, Darby & Cushman

[57] ABSTRACT

An IC card has a data memory for storing at least one registration key data and a control element for controlling the data memory and is adapted to receive key data, as collation data, from an outside, collate it with the registration key data stored in the data memory, hold a result of collation in a holding section such as a RAM, and determine whether or not a subsequent access instruction be executed for the data memory. A present system above includes a unit, responsive to instruction data input from the outside, for internally clearing the collation result of the key data. As a result, the collation result of the key data is not held at all times during a power supply. It is thus possible to prevent any unauthorized access to an IC card data by an unauthorized person during the power supply and to structure a flexible system.

11 Claims, 13 Drawing Sheets

| | 21 | | | 22 | | | 23 | |
|---|---|---|---|---|---|---|---|---|
| KID 01 | KEYDATA 1 | 1 0000000 | 0 | AIDgg | AREA G | 10000000 / 10000000 | A/A |
| KID 02 | KEYDATA 2 | 01000000 | 1 | AIDhh | AREA H | 10000000 / 01000000 | A/A |
| KID 03 | KEYDATA 3 | 00100000 | 0 | | | | |
| KID 04 | KEYDATA X4 | 00010000 | 0 | AIDaa | AREA A | 10000000 / 10010000 | A/A |
| KID 05 | KEYDATA X5 | 00001000 | 0 | AIDbb | AREA B | 10000000 / 00000000 | A/O |
| KID 06 | KEYDATA X6 | 00000100 | 0 | AIDcc | AREA C | 00000000 / 00001100 | A/O |
| KID 04 | KEYDATA Y4 | 00010000 | 1 | AIDdd | AREA D | 10000000 / 10001000 | A/A |
| KID 05 | KEYDATA Y5 | 00001000 | 1 | AIDee | AREA E | 10000000 / 00010000 | A/O |
| KID 06 | KEYDATA Y6 | 00000100 | 0 | AIDff | AREA F | 10000000 / 00001000 | A/O |

DFN = XXX (between 21 and 22)
DFN = YYY (between 22 and 23)

PORTABLE ELECTRONIC APPARATUS

BACKGROUND OF THE INVENTION

1. Field of the Invention

The present invention relates to a portable electronic apparatus, known as an Integrated Circuit Card (IC Card), which incorporates an IC chip having, e.g., a nonvolatile memory and a control element such as a CPU and, more particularly, to a portable electronic apparatus in which an access control method for an area of the memory is improved.

2. Description of the Related Art

A so-called IC card which incorporates an IC chip having, e.g., a nonvolatile memory and a control element such as a CPU has been developed as a portable storage medium. An IC card of this type as disclosed in U.S. Pat. No. 4,988,855 inventor of which is same as present invention, stores an identification number as key data in its internal memory. When an identification number is externally input, it is collated with the registered identification number stored in the memory, and subsequent memory access is enabled or disabled in accordance with the collation result.

In the conventional IC card, the collation result continues to be held at all times during the power supply to the IC card. If, in this case, an authorized person makes a key data collation for example, a corresponding collation result is held during a period of time in which the IC card is inserted. If, on the other hand, any unauthorized person gains access to the IC card, by some method, during an intervening period of time, it is not possible at all to prevent any unauthorized access to the IC card data.

SUMMARY OF THE INVENTION

It is accordingly an object of the present invention to provide a portable electronic apparatus which stops a collation result of collation information from being held during a power supply and can prevent any unauthorized access, by an unauthorized person, during an intervening period of time.

Another object of the present invention is to provide a portable electronic apparatus which can structure a flexible system.

According to one aspect of the present invention, a portable electronic apparatus having a memory section and a control section for controlling access from an outside to the memory section to allow selective inputting/ outputting of data relative to the outside, comprising:

a unit, provided in the memory section, for storing at least one first collation information;

a unit for collating the first collation information and second collation information which is input from the outside and for providing a result of collation;

a unit for holding the result of collation from the collating unit;

a unit, provided for the first collation information, for storing first volatility information indicating whether the collation result held in the holding unit be cleared or not;

a unit for performing a given processing in response to an instruction input from the outside; and a unit for clearing the collation result from the holding means at completion of the given processing, when the first volatility information means indicates that the collation result is to be cleared.

That is, the IC card contains a unit which, after an instruction is input from the outside, clears the collation result of the collation information depending upon each collation information. By so doing, the collation result of the collation information can be cleared during a time period in which a power is supplied to the IC card. It is thus possible to prevent any unauthorized access to the IC card data by an unauthorized person intervening during the power supply period.

According to a second aspect of the present invention, whether or not the collation result of the collation information is held is set for each input instruction. It is, therefore, possible to prevent any unauthorized access to an IC data during a power supply period of time and hence to structure a flexible system.

According to a third aspect of the present invention, when a given instruction is input from the outside, it is possible to, depending upon an area of a memory section accessed by the instruction, determine to clear the collation result. It is, therefore, possible to determine, for each access area involved, whether the collation result of the collation information be held or not during the power supply time period. It is thus possible to prevent any unauthorized access to the IC card data during the power supply time period and hence to structure a flexible system.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings.

Figure 1:
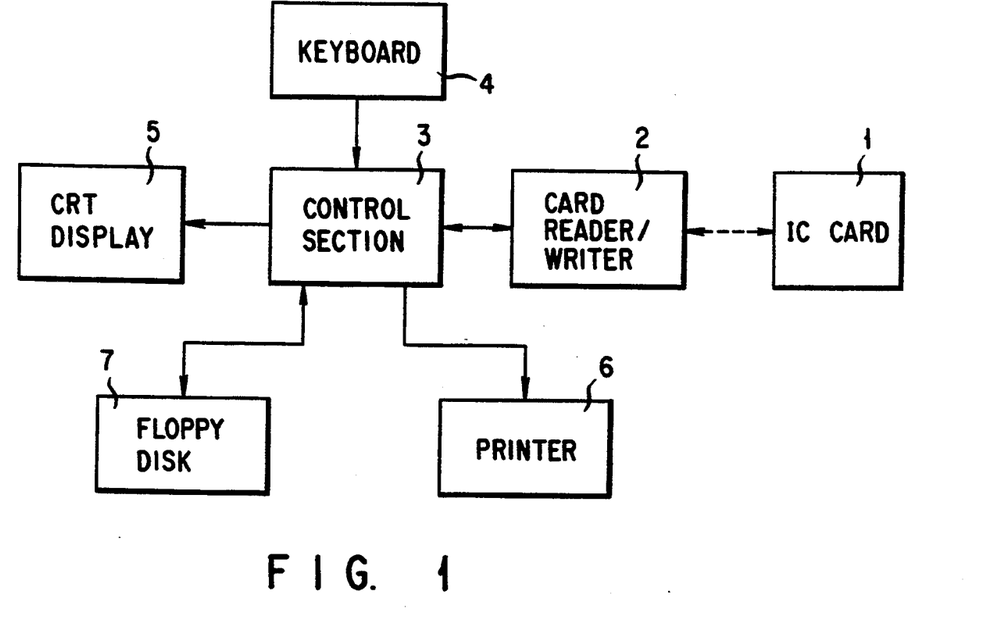
FIG. 1 is a block diagram showing an arrangement of a handing terminal device and a portable electronic apparatus of the present invention.

FIG. 1 shows a terminal device handling an IC card as a portable electronic apparatus according to the present invention. An IC card 1 can be connected to a control section 3 comprising, e.g. a CPU through a card reader/writer 2. The control section 3 is connected to a keyboard 4, a CRT display 5, a printer 6, and a floppy disk device 7. The IC card is held by a user, and is used for referring to key data (identification number) known by the user upon purchasing of commodity and storing necessary data.

Figure 2:
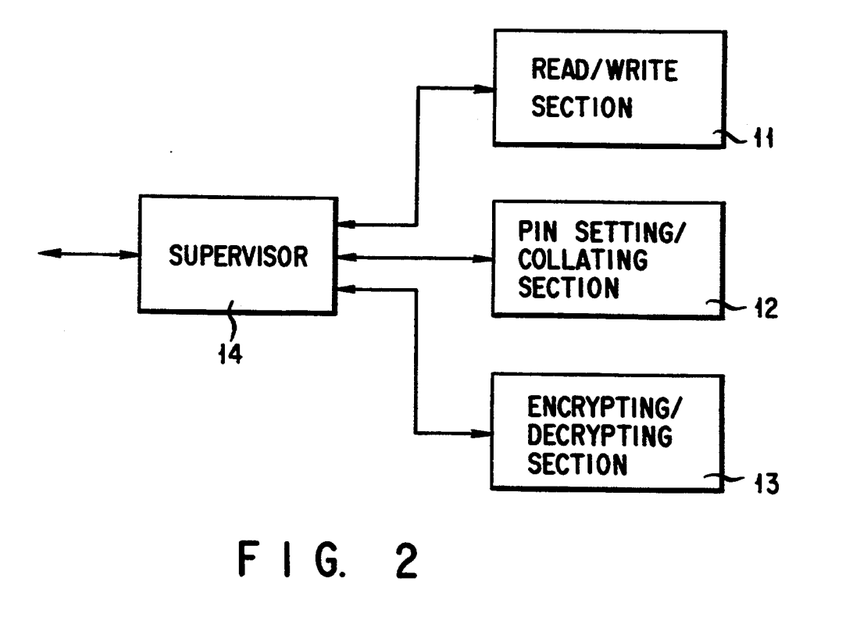
FIG. 2 is a block diagram showing functions of an IC card shown in FIG. 1.

FIG. 2 shows function blocks of the IC card. The IC card is constituted by sections for executing basic functions, i.e., a read/write section 11, a PIN setting/collating section 12, and an encrypting/ decrypting section 13, and a supervisor 14 for managing these basic functions.

The read/write section 11 has a function of reading, writing, or deleting data with respect to a data memory 16 or the like.

The PIN setting/collating section 12 has a function of performing storage and readout inhibition processing operations of an identification number set by the user, and a function of collating the identification number after the identification number is set to permit the subsequent processing.

The encrypting/decrypting section 13 has a function of encrypting data in order to prevent disclosure or forgery of communication data when data is transmitted from the control section 3 to another terminal device through a communication line, and of decrypting the encrypted data. For example, the section 13 has a function of performing data processing in accordance with an encryption algorithm having a sufficient encryption strength, such as the DES (Data Encryption Standard).

The supervisor 14 has a function of decoding a function code input from the card reader/writer 2 or a function code added with data, and selecting and executing a necessary one of the basic functions.

Figure 3:
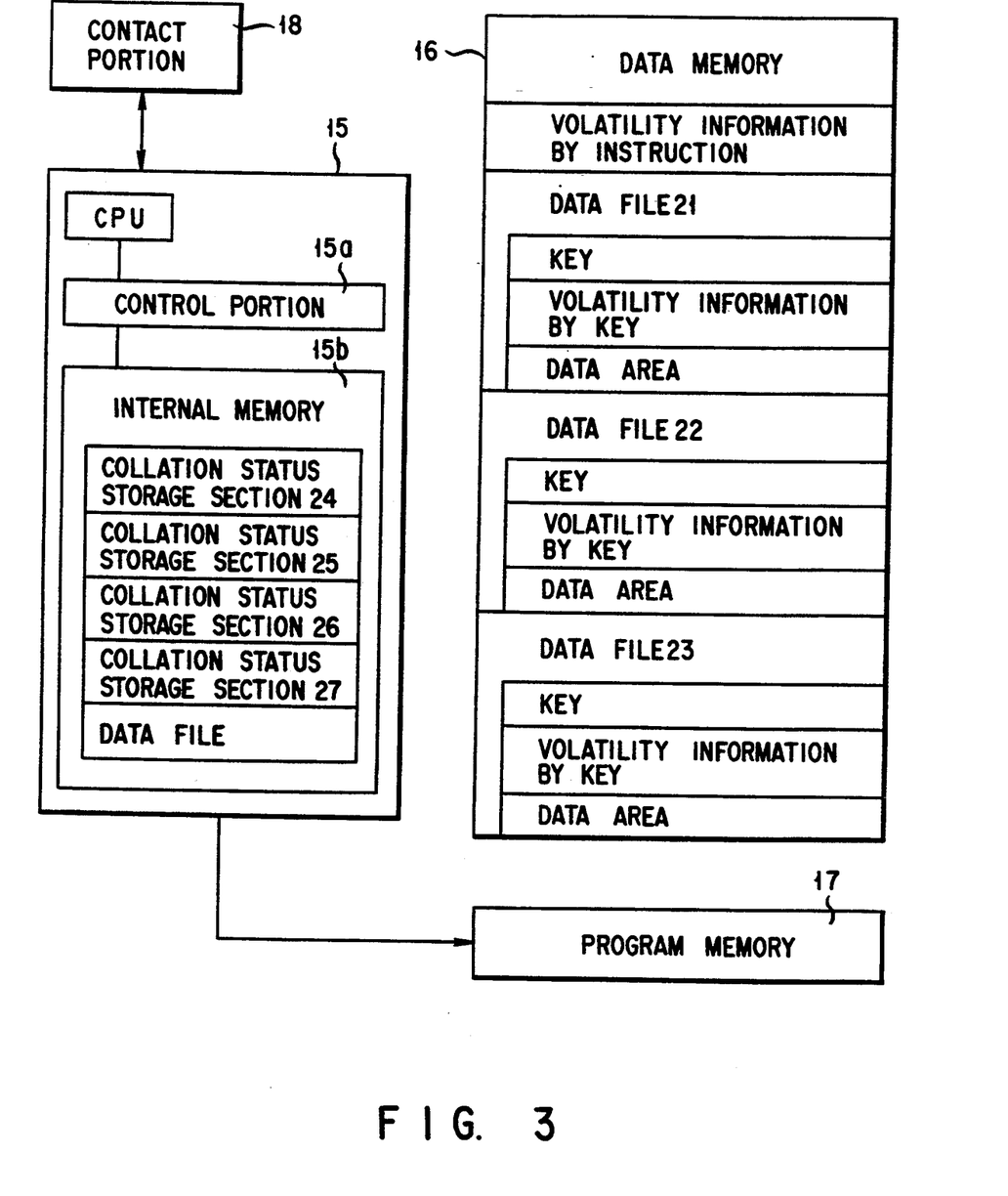
FIG. 3 is a block diagram showing an arrangement of the IC card shown in FIG. 1.

In order to realize these functions, the IC card 1 comprises a control element (control section) 15 such as a CPU, a data memory (memory section) 16, a program memory 17, and a contact portion 18 for obtaining an electrical contact with the card reader/writer 2, as shown in FIG. 3. Of these components, the control element 15, the data memory 16, and the program memory 17 are constituted by a single IC chip (or a plurality of IC chips), and are embedded in an IC card main body.

The program memory 17 comprises, e.g., a mask ROM, and stores a control program and the like of the control element 15 having subroutines for realizing the above-mentioned basic functions.

Figure 4:
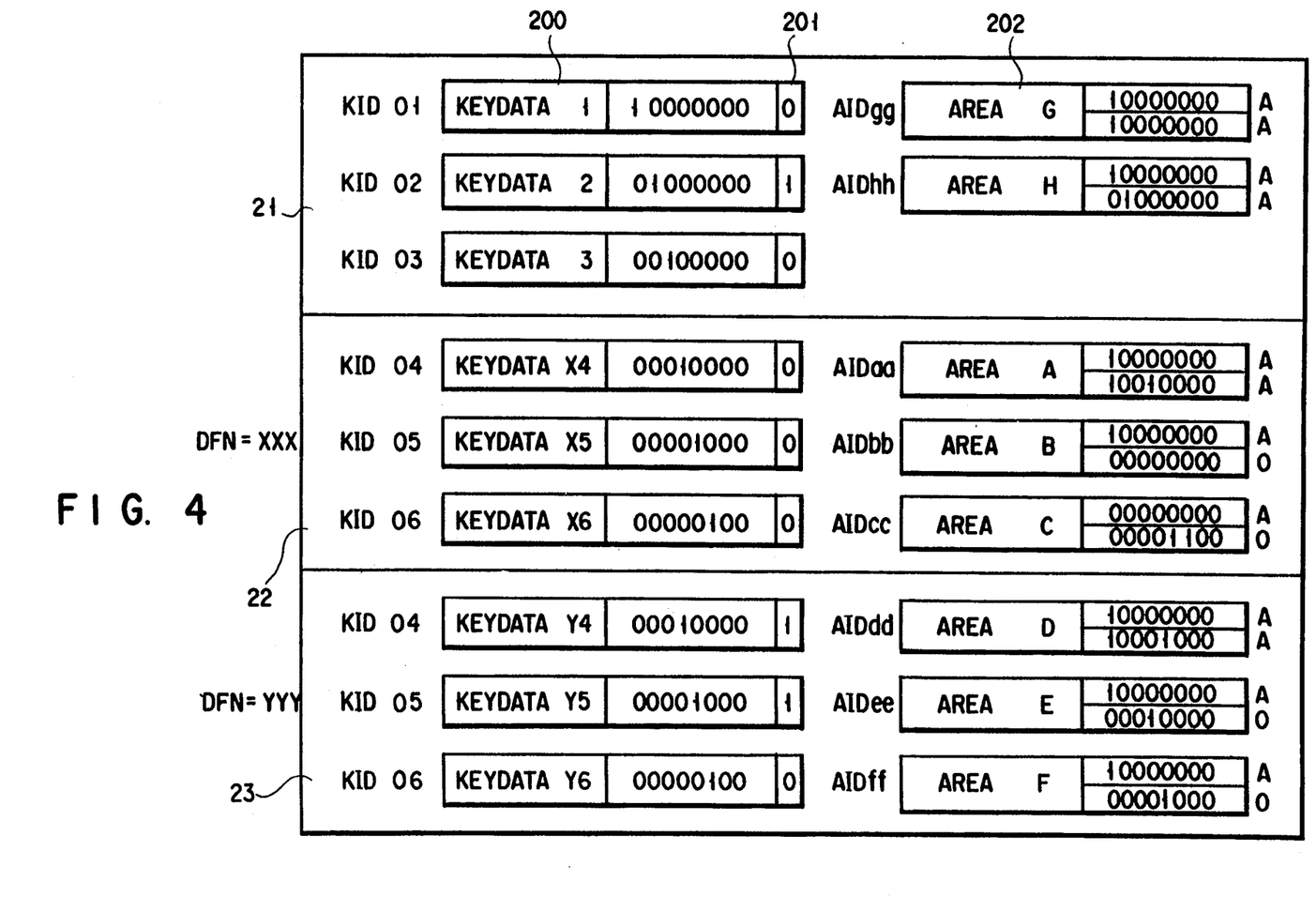
FIG. 4 shows a file structure of a data memory shown in FIG. 3.

As shown in FIG. 4, the data memory 16 comprises, e.g., a programmable nonvolatile memory such as an EE-PROM, used for storing various data.

The data memory 16 is constituted by a common data file (first region) 21 accessed in all the applications and a plurality of application data files (second regions) 22 and 23 accessed in units of applications, as shown in FIG. 4. Each of the data files 21, 22, and 23 stores a plurality of key data (identification number) 200, and includes a plurality of areas 202.

A data file name (DFN) is given to each of the application data files 22 and 23. When a data file name is designated using data file selection instruction data (to be described later), an application data file to be accessed is recognized.

Figures 5, 6:
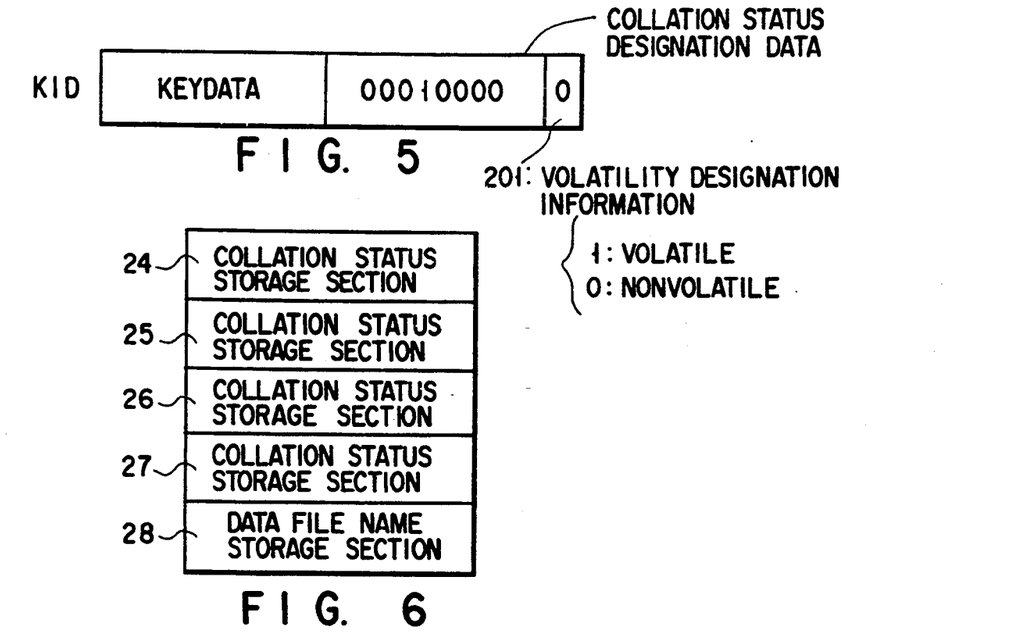
FIG. 5 is a view for explaining identification data for key data.
FIG. 6 is a view for explaining a collation status storage section and a data file name storage section.

Identification data (KID) for designating key data is given to each key data, as shown in FIG. 5. When identification data is designated using key data collation instruction data (to be described later), key data to be subjected to collation processing is recognized.

In FIG. 4, identification data KID01, KID02, and KID03 are given to key data 1, 2, and 3 belonging to the common data file 21. Identification data KID04, KID05, and KID06 are given to key data X4, X5, and X6 belonging to the application data file 22. Identification data KID04, KID05, and KID06 are also given to key data Y4, Y5, and Y6 belonging to the application data file 23. Collation status designation data is given to each key data, as shown in FIG. 5. The collation status designation data is used to identify whether key data necessary for subsequent access has already been collated.

As shown in FIG. 5, for example, each key data is given that information designating whether it is volatile or not. The volatility designation information 201, if being represented by "1", shows volatile data, that is, key data whose collated state is to be cleared after the execution of a given command and, if being represented by "0", shows key data whose collated state is to be held, as will be set out below.

Data indicating whether key data has already been collated is stored in collation status storage sections 24 to 27 shown in FIG. 6. The collation status storage sections 24 to 27 are allocated in a RAM incorporated in, e.g., the control element 15. Key data collation status belonging to the common data file 21 is stored in the collation status storage section 24 or 26, and key data collation status belonging to the application data files 22 or 23 is stored in the collation status storage section 25 or 27.

As shown in FIG. 6, a data file name storage section 28 is allocated together with the collation status storage 24 to 27. The data file name storage section 28 stores a name of the data file selected as an object to be accessed by data file selection instruction data (to be described later).

Figure 7:
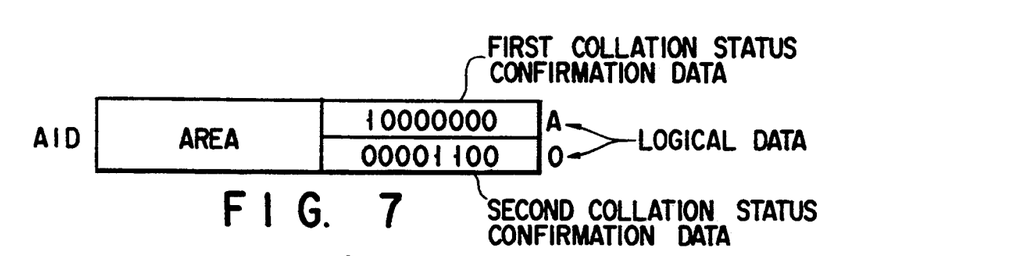
FIG. 7 is a view for explaining identification data for an area.

As shown in FIG. 7, area identification data (AID) for designating an area is given to each area. Therefore, when the identification data is designated using area processing instruction data (to be described later), an area serving as an object of area processing can be recognized.

In FIG. 4, identification data AIDgg and AIDhh are given to areas G and H belonging to the command data file 21. Identification data AIDaa, AIDbb, and AIDcc are given to areas A, B, and C belonging to the application data file 22. Identification data AIDdd, AIDee, and AIDff are given to areas D, E, and F belonging to the application data file 23.

Each area is added with first and second collation status confirmation data, as shown in FIG. 7. Logical data (A or O) are given to these first and second collation status confirmation data. The first and second collation status confirmation data request collation statuses of key data necessary in an area access. The logical data indicates whether a combination of the collation status confirmation data is an AND or OR logic. In the case of the AND logic, the logical data is set to be "A", and in the case of the OR logic, it is set to be "O".

Figure 8:
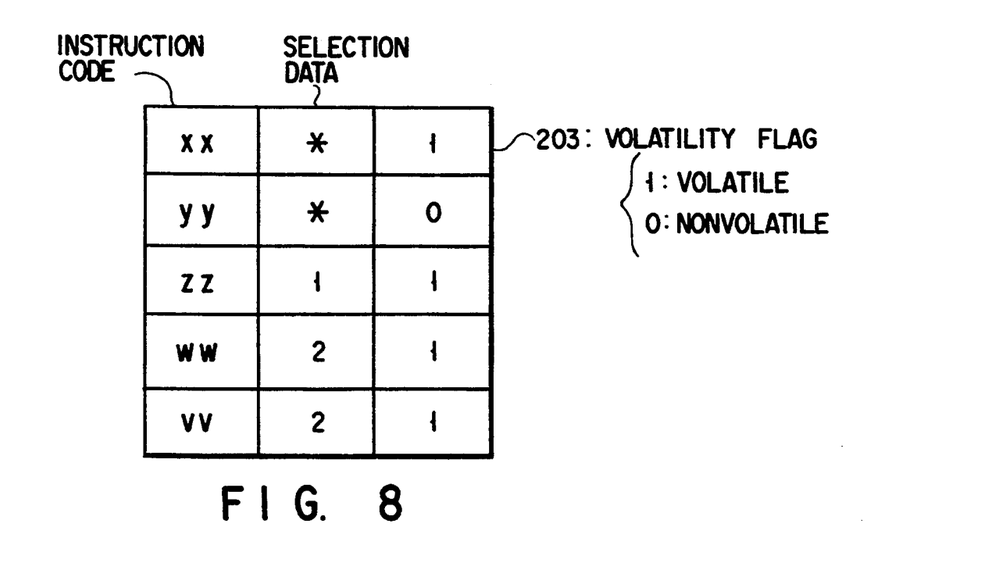
FIG. 8 is a view for explaining a data table storing selection data for selecting collation status confirmation data and volatility flags for various instruction codes.

FIG. 8 shows a data table for selecting one of the two collation status confirmation data assigned to each area in units of instruction codes. The data table stores selection data for selecting the collation status confirmation information in correspondence with various instruction codes, and this data table is allocated in, e.g., the data memory 16.

Each of various kinds of instruction codes is given a flag 203, as shown in FIG. 8, representing whether or not it is a "volatility" instruction. If the volatility instruction flag represents "0", that is, a nonvolatile state, the contents of the collation status storage sections 26 and 27 are held even after the execution of the instruction. If, on the other hand, the volatility instruction flag represents "1", that is, a volatile state, the contents of the collation status storage sections 26 and 27 are cleared.

The embodiment of the portable electronic apparatus according to the present invention will be described below with reference to the flow charts shown in FIGS. 9A through 9H. On the flow charts, the common data file 21 is abbreviated as CDF, and the application data file 22 or 23 is abbreviated as ADF.

Figure 9A:
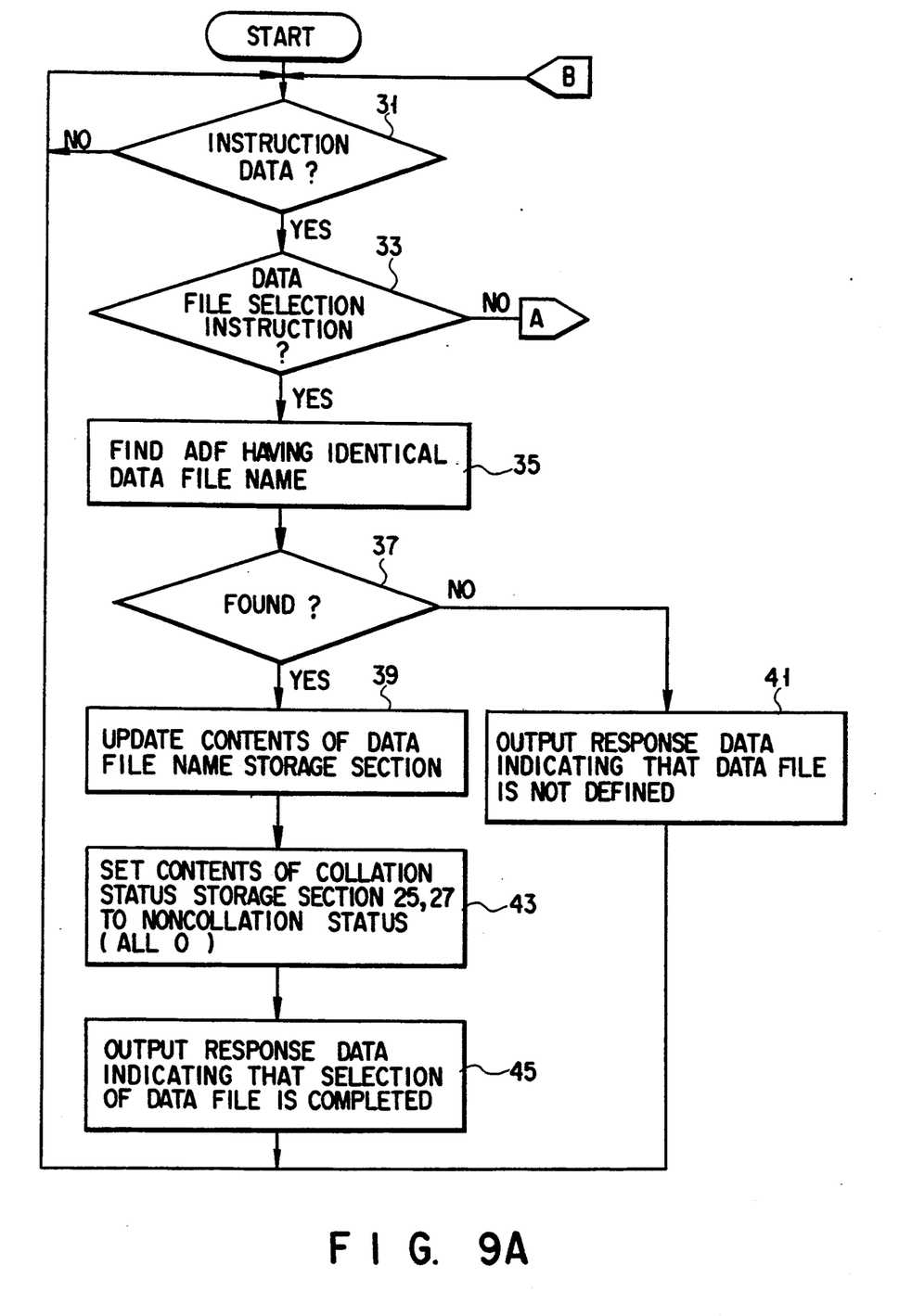
FIGS. 9A through 9H are flow charts for explaining processing operations.
Figure 10:
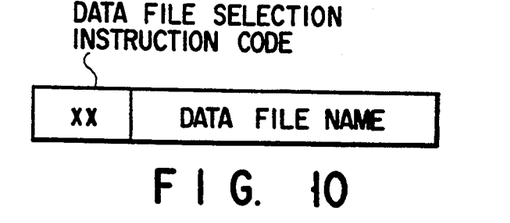
FIG. 10 shows a format of data file selection instruction data.

Data file selection processing will be described below with reference to the flow chart shown in FIG. 9A. In a steady state, the control waits for instruction data. If instruction data is input in step 31, the control element 15 checks in step 33 if the input instruction data is a data file selection instruction shown in FIG. 10. If NO in step 33, the flow advances to step 47, and the control element 15 executes another processing.

If YES in step 33, the control element 15 finds an application data file having identical data file name to that in this instruction data from the data memory 16 in step 35. If no such file is found in step 37, the control element 15 outputs response data indicating that the data file is not defined in step 41, and the flow returns to the instruction data standby state in step 31.

If YES in step 37, the control element 15 stores the data file name in this instruction data in the data file name storage section 28 of FIG. 6 in step 39, and sets the content of the collation status storage sections 25 and 27 in a non-collation status, i.e., sets all the bits to be "0" in step 43. The control element outputs response data indicating that the selection of the data file is completed, in step 45, and the flow then returns to the instruction data standby state in step 31.

When the IC card is started, the contents of the storage sections 24 to 28 in FIG. 6 are all "0"s. In this case, if data file selection instruction data having a data file name "xxx" is input, a value "xxx" is stored in the data file name storage section 28.

Figure 9B:
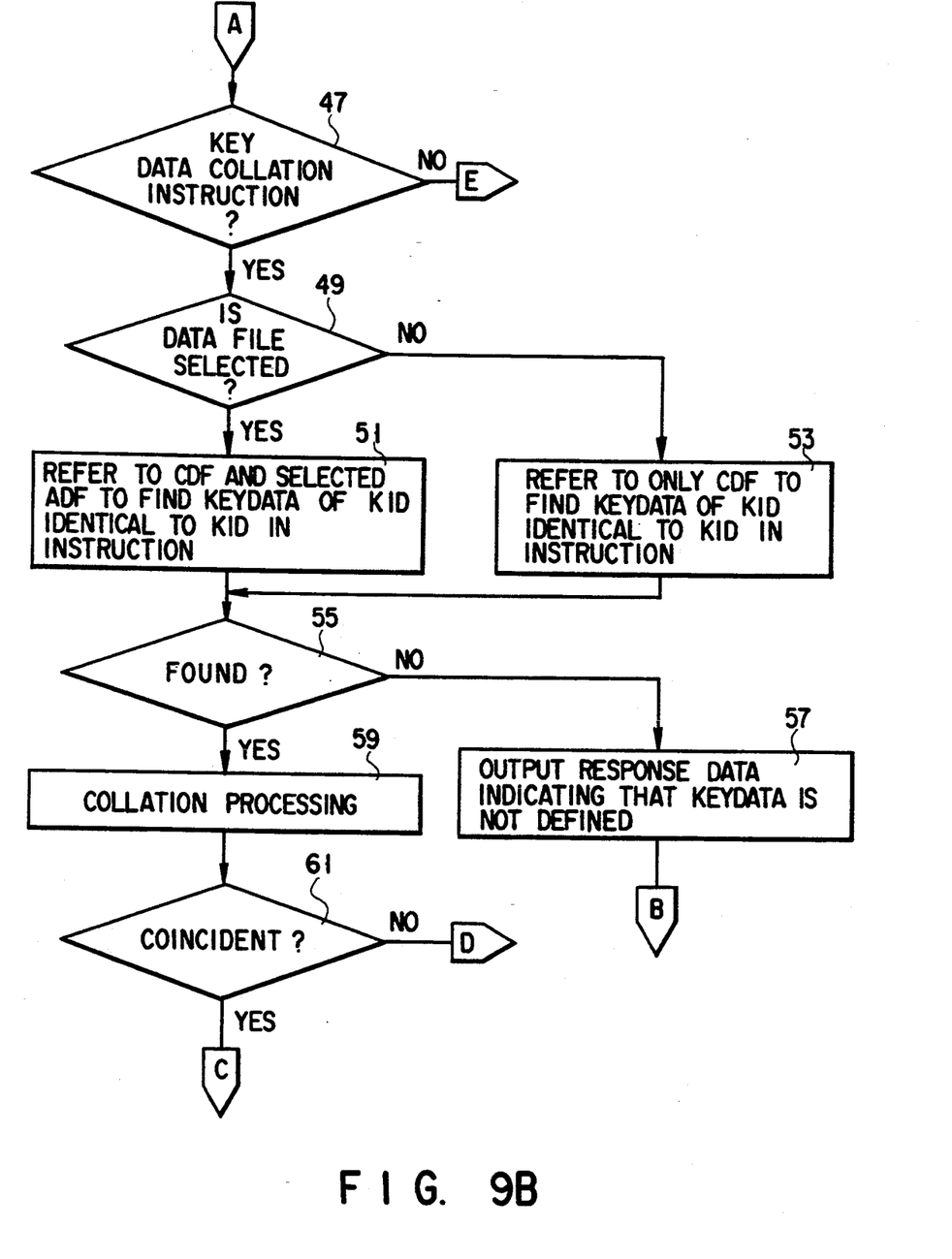
Figure 9C:
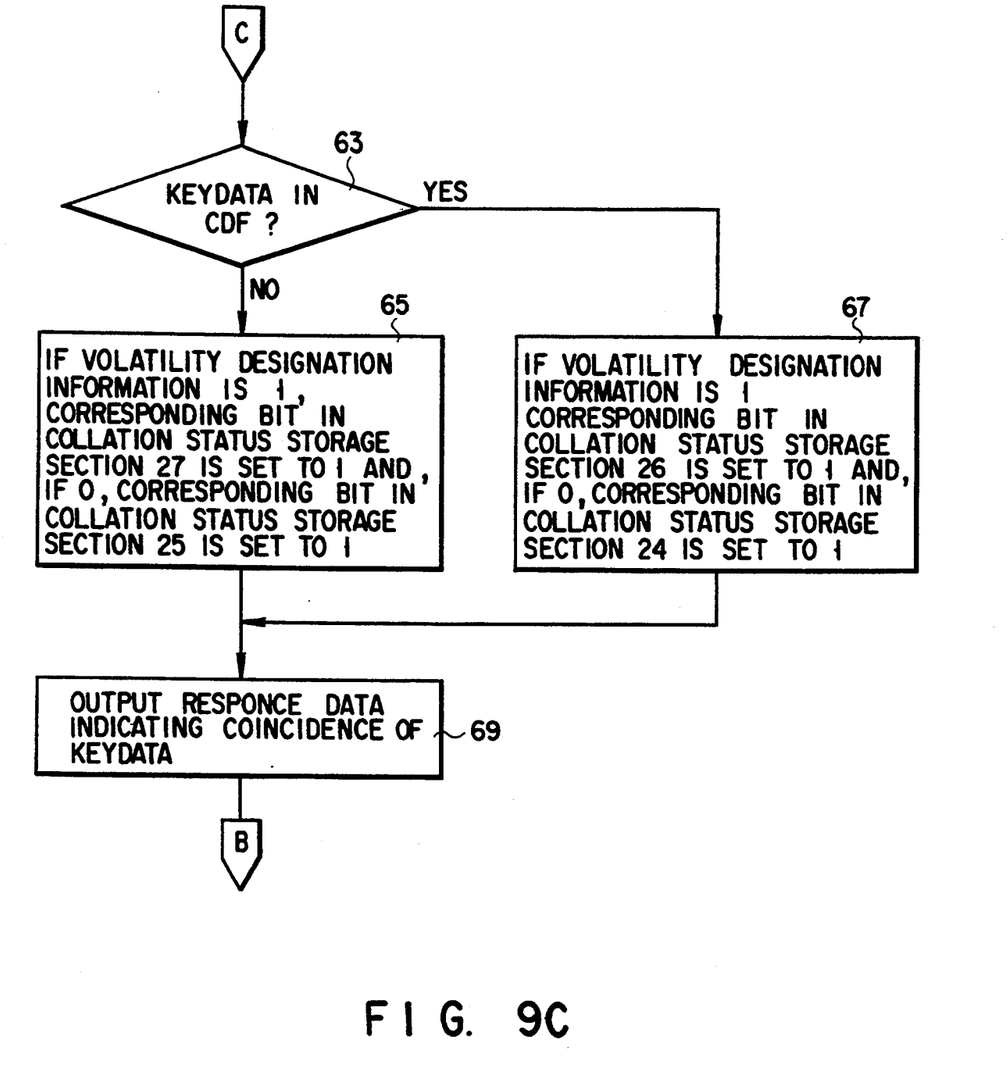
Figure 9D:
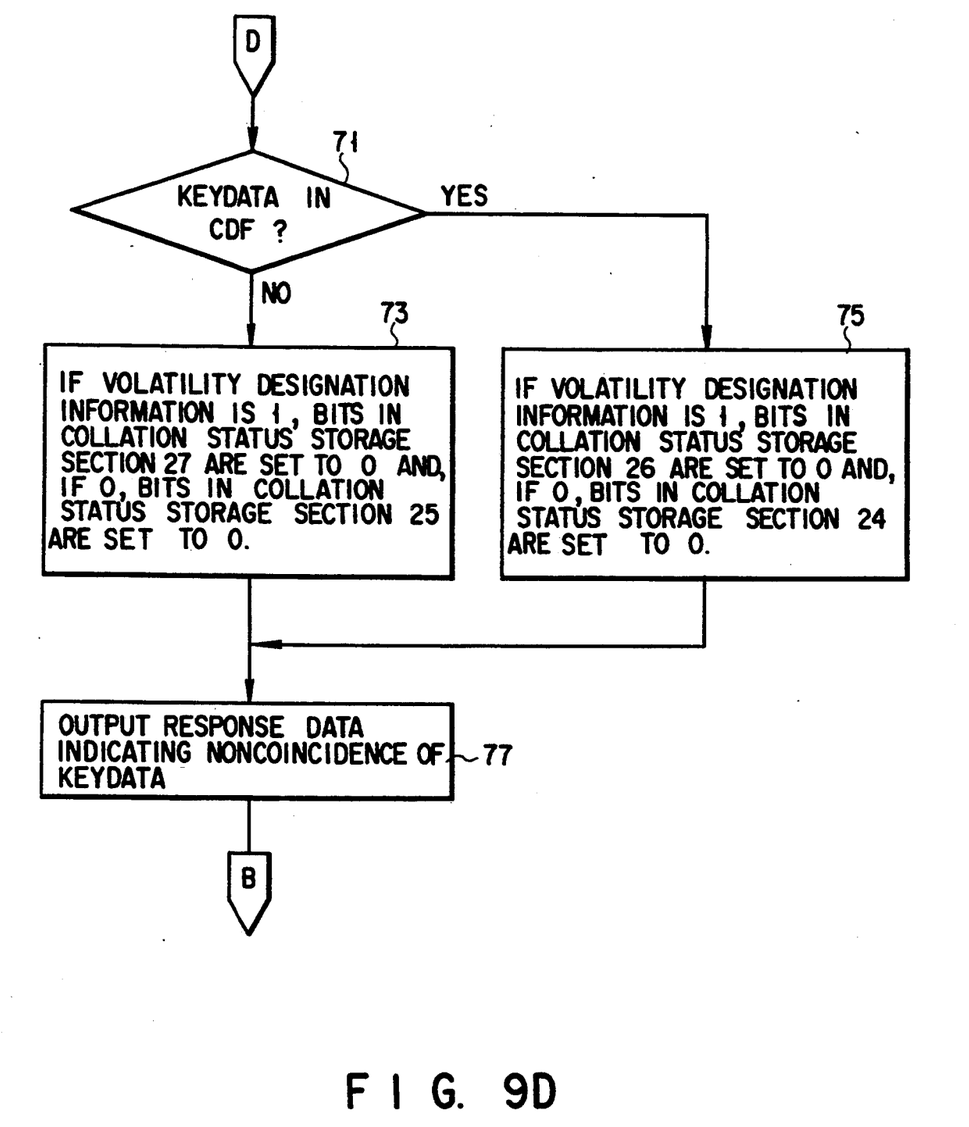
Figure 11:
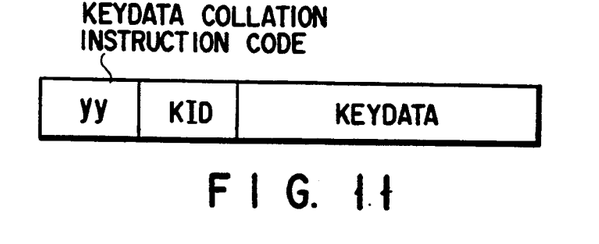
FIG. 11 shows a format of key data collation instruction data.

Key data collation processing will be described below with reference to the flow charts shown in FIGS. 9B through 9D. If it is determined in step 33 that the input instruction data is not the data file selection instruction data, the control element 15 checks in step 47 if the input instruction data is a key data collation instruction shown in FIG. 11. If NO in step 47, the flow advances to step 79, and the control element 15 executes another processing.

If YES in step 47, the control element 15 checks in step 49 if the content of the data file name storage section 28 is all "0"s (whether or not the data file is selected). If it is determined in step 49 that the content is all "0"s, this means that no data file is selected, and the control element 15 refers to the common data file in step 53 to find key data having identical identification data (KID) to that in the input instruction data in step 55. If it is determined in step 49 that the content is not all "0"s, this means that a data file is selected. Therefore, the control element 15 refers to the common data file 21 and the selected one of the application data files 22 and 23 in step 51 to find key data having identical identification data to that in the input instruction data in step 55. If NO in step 55, the control element 15 outputs response data indicating that the key data is not defined, in step 57, and the flow returns to the instruction data standby state in step 31.

If YES in step 55, the control element 15 collates the found key data and key data in the input instruction data in step 59. If both the data coincides with each other as a result of collation, the control element 15 determines in step 63 whether the key data belongs to the common data file 21 or to the application data files 22 and 23.

If, as a result of determination, the key data belongs to the common data file 21, the control element 15 refers to a volatility designation information 201 given to the key data in step 67 to see whether the volatility designation information 201 is represented by "0" or "1". If "0", the control element 15 further refers to collation status designation information to make its bit "1" position a bit "1" in a corresponding position of the collation status storage section 24. If "1", the same processing is performed on the bit of the collation status storage section 26.

If, on the other hand, the key data belongs to the application data files 22 or 23, the control element 15 performs a similar processing on the bit of the collation status storage section 25 or 27 in step 65 to make a bit "1" in a corresponding position of the collation status storage section 25 or 27. In step 69, the control element 15 outputs response data indicating the coincidence of the key data and control is returned back to the instruction data standby state.

As a result of collation in step 61, if a noncoincidence is found between the two key data, and the volatility designation information 201 is "1", the control element 15 similarly sets a bit of the collation status storage sections 26 or 27 corresponding to the collation status designation information to "0" in step 73 or 75. In step 77, the control element 15 outputs response data indicating a noncoincidence of the key data, and the flow returns to the instruction data standby state.

For example, when key data 1 and 2, and key data Y5 and Y6 are collated after the application data file 23 is selected by the data file selection instruction data the content of the collation status storage section 24 is set to be "10000000", the section 26 is set to be "01000000", section 25 is set to be "00000100" and section 27 is set to be "00001000", and the content of the data file name storage area 28 is set to be "YYY". When the application data file 22 is selected thereafter, the content of the collation status storage sections 24 and 26 are left unchanged, the content of the collation status storage sections 25 and 27 are set to be "00000000", and the content of the data file name storage section 28 is set to be "xxx".

Figure 12A:
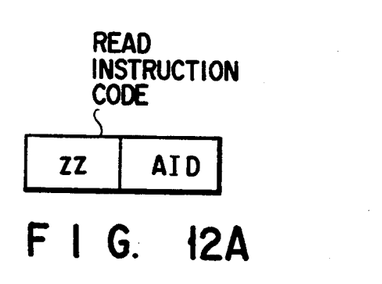
FIG. 12A shows a format of read instruction data to an area.
Figure 12B:
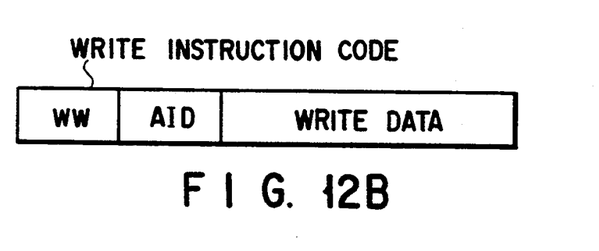
FIG. 12B shows a format of write instruction data to an area.
Figure 12C:
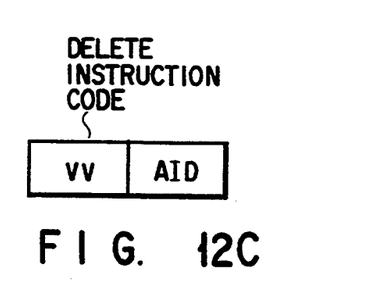
FIG. 12C shows a format of delete instruction data to an area.

Next, area processing (data area, write, and delete processing in an area) will be described below with reference to the flow charts shown in FIGS. 9E through 9H. If it is determined in step 47 that the input instruction data is not the key data collation instruction data, the control element 15 checks in step 79 if the input instruction data is read instruction data shown in FIG. 12A, write instruction data shown in FIG. 12B, or delete instruction data shown in FIG. 12C. If NO in step 79, the control element 15 executes another processing.

Figure 9E:
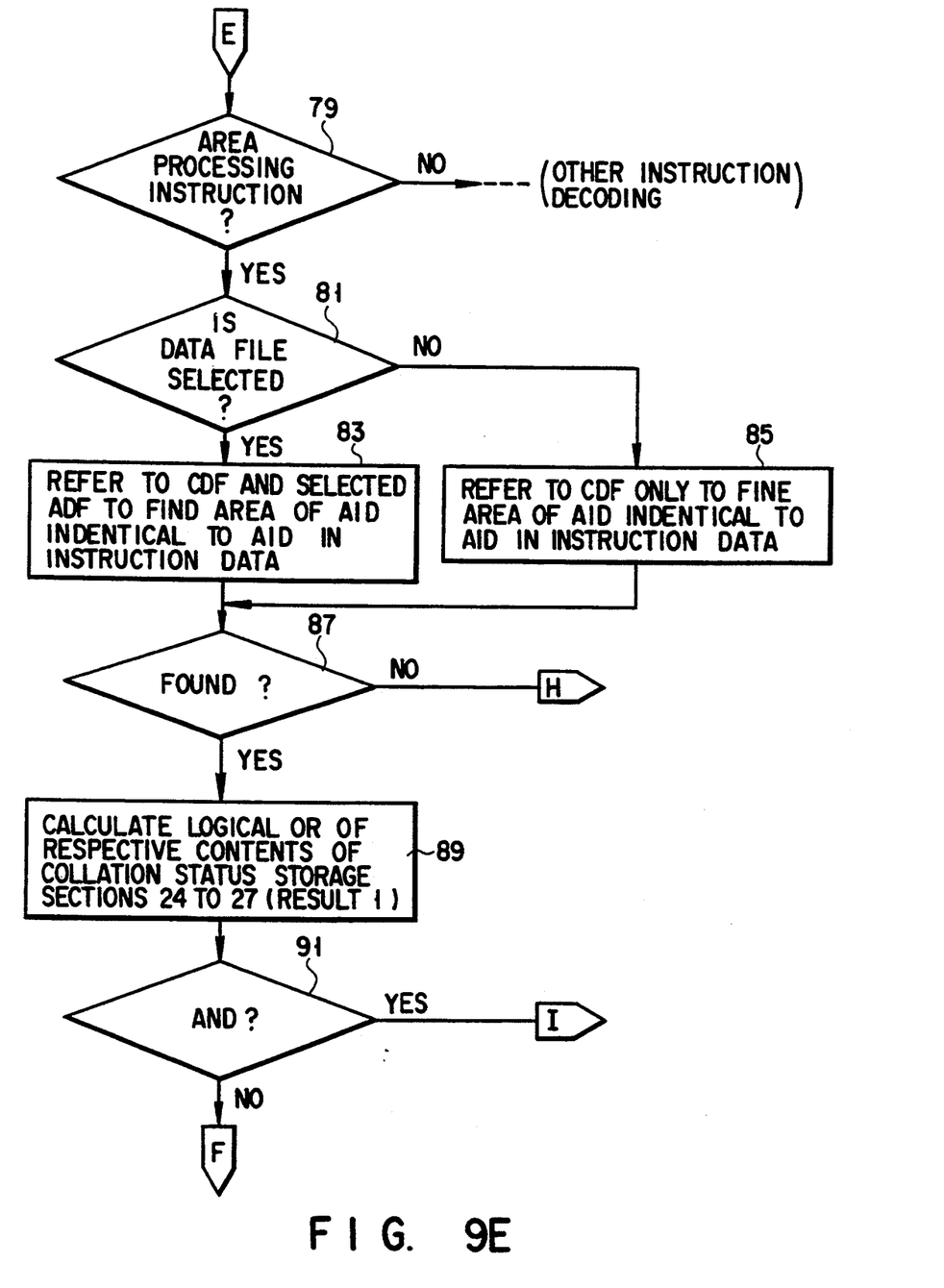

If YES in step 79, the control element 15 checks in step 81 if the content of the data file name storage section 28 is all "0"s (whether or not the data file is selected). If it is determined in step 81 that the content is all "0"s, this means that no application data file is selected, and the control element 15 refers to the common data file 21 to find an area having identical identification data (AID) to that in the input instruction data in step 85.

If it is determined in step 81 that the content is not all "0"s, this means that a data file is selected. Therefore, the control element 15 refers to the common data file 21 and the selected one of the application data files 22, 23 to find an area having identical identification data (AID) to that in the input instruction data in step 83. If no such area is found in step 87, the control element 15 confirms the volatility instruction flag corresponding to the instruction code at the data table (see FIG. 8) and, only when the volatility instruction flag is represented by "1", the collation status storage sections 26 and 27 are cleared. The control element 15 outputs response data indicating that an area is not defined, in step 99, and the flow returns to the instruction data standby state.

If YES in step 87, the control element 15 calculates a logical OR of the contents of the collation status storage sections 24 to 27 in step 89, and sets the OR results as "result 1".

The control element 15 searches for an identical instruction code to that in the input instruction data from the data table shown in FIG. 8 to select one of two collation status confirmation data assigned to each area. If the area processing instruction data is "read" instruction data, since its instruction code is "zz", the first collation status confirmation data is selected by corresponding selection data "1", if it is "write" instruction data, since its instruction code is "ww", the second collation status confirmation data is selected by corresponding selection data "2", and if it is "delete" instruction data, since its instruction code is "vv", the second collation status confirmation data is selected by corresponding selection data "2".

Figure 9F:
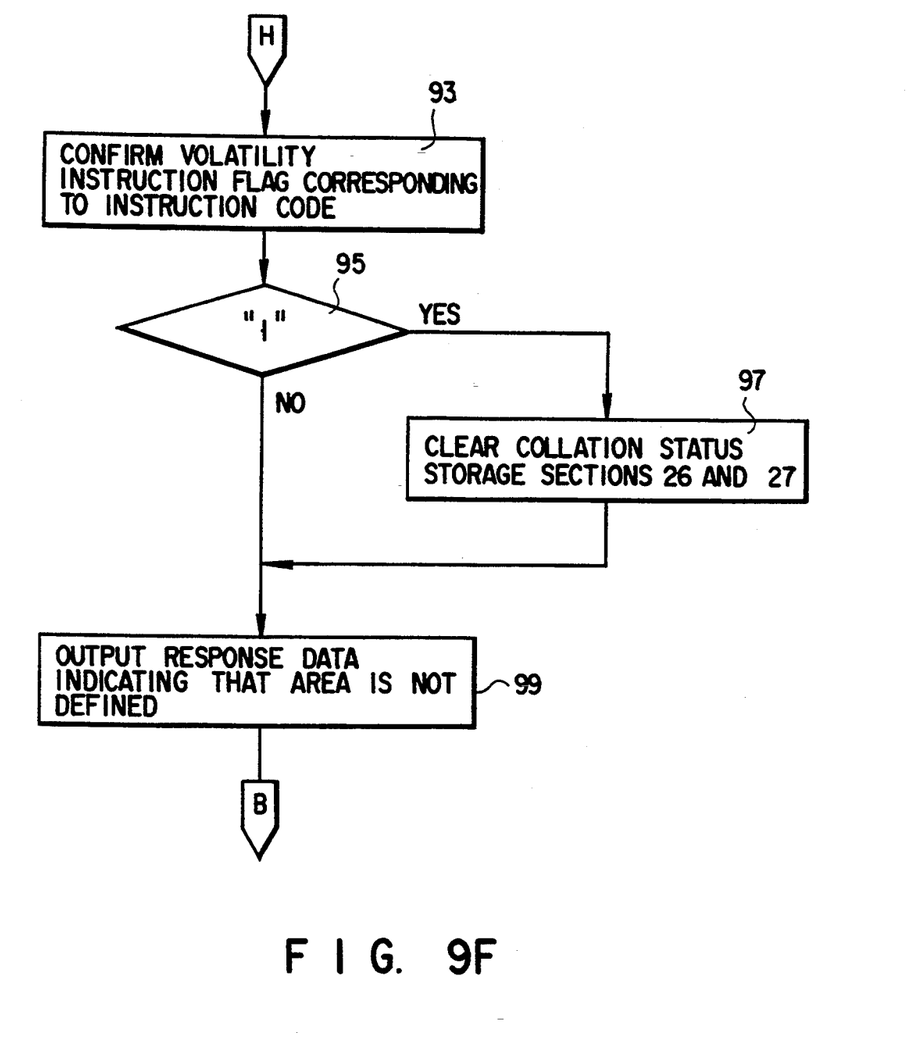

When the first or second collation status confirmation data is selected in this manner, the control element 15 checks if the logical data added thereto is an AND logic in step 91. If NO in step 91 (if an OR logic is selected), the control element 15 checks in step 103 if the bits of the collation status confirmation data are all "0"s. If YES in step 103, the control element 15 does not confirm the collation status and executes processing for the area in step 119.

If it is determined in step 103 that any bit is "1", the control element 15 checks in step 105 if a bit in the result 1 corresponding to the bit "1" of the collation status confirmation data is set to be "1". As a result of step 105, if none of bits are "1", the control element 15 confirms the volatility instruction flag corresponding to the instruction code at the data table (see FIG. 8) and, only when the volatility instruction flag is represented by "1", the collation status storage sections are cleared. The control element 15 outputs response data indicating disable of access in step 117, and the flow returns to the instruction data standby state. As a result of step 105, if any bit is "1", the control element performs processing for the area in step 119.

Figure 9G:
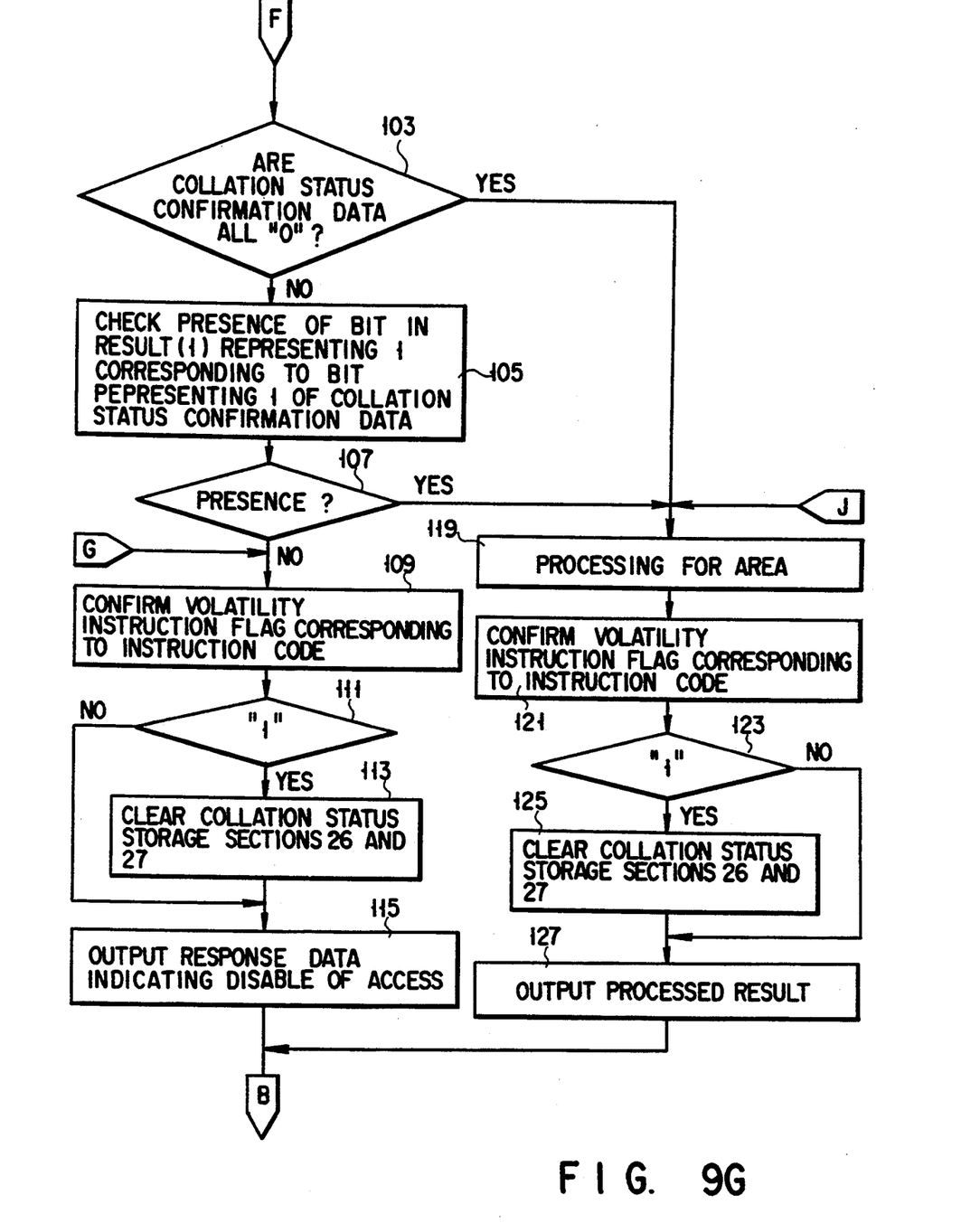

If YES in step 91, the control element 15 similarly checks in step 129 if the content of the collation status confirmation data is all "0"s. If YES in step 129, the control element 15 determines that an access to the corresponding area is disabled, the control element 15 confirms the volatility instruction flag corresponding to the instruction code at the data table (see FIG. 8) and, only when the volatility instruction flag is represented by "1", the collation status storage sections are cleared. The control element 15 outputs response data indicating disable of access in step 117. The flow then returns to the instruction data standby state.

Figure 9H:
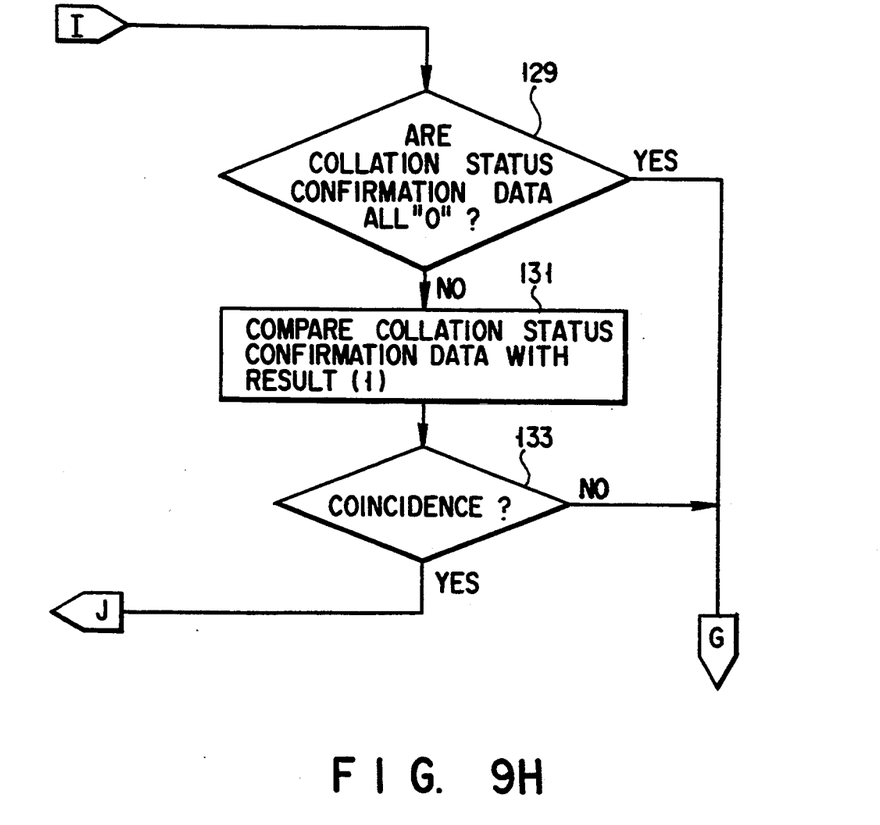

If it is determined in step 129 that any bit is "1", the control element 15 compares this collation status confirmation data with the result 1. If it is determined in step 133 that a noncoincidence is found between these data, the control element 15 confirms the volatility instruction flag corresponding to the instruction code at the data table (see FIG. 8) and, only when the volatility instruction flag is represented by "1", the collation status storage sections are cleared. The control element 15 outputs response data indicating disable of access in step 117, and the flow returns to the instruction data standby state in step 31. If it is determined in step 133 that a coincidence is found between the two data, the control element 15 performs processing for the area in step 119. After the processing, the control element 15 confirms the volatility instruction flag corresponding to the instruction code at the data table (see FIG. 8) and, only when the volatility instruction flag is represented by "1", the collation status storage sections are cleared. The control element 15 outputs the processing result as response data in step 127, and the flow then returns to the instruction data standby state in step 31.

More specifically, in FIG. 4, for an area B, the logical data of the first collation status confirmation data added to the area B indicates an AND logic "A", and the first collation status confirmation data is "10000000". Therefore, a read access to the area B can be enabled after only the key data 1 is collated. The second collation status confirmation data is "00000000", and its logical data indicates an OR logic "O". Therefore, write and read accesses to the area B can be performed without collation of key data.

For an area C, the first collation status confirmation data is "00000000", and its logical data indicates an AND logic "A". Therefore, a read access to the area C is disabled. The second collation status confirmation data is "00001100", and its logical data indicates an OR logic "O". Therefore, after one of the key data X5 and X6 is collated, write and delete accesses to the area C are enabled.

After collation of the key data Y5 and Y6, when the application data file 22 is selected to execute a write access to the area C, the collation statuses of the key data Y5 and Y6 are cleared upon selection of the data file, and the access to the area C is disabled.

The collation statuses of key data in the application data files 22 and 23 are effective for only an access to an area in an identical application data file.

The key data X4 of the application data file 22 and the key data Y4 of the application data file 23 are added with identical identification data (KID). When the identification data is designated, since one of these application data files serves as an object to be accessed, these key data will not be confused. However, identical identification data (KID) is not used between the common data file and the other application data files. Note that this also applies to the identification data (AID) given to an area.

In the identical application data file, since the identification data (AID) and identification data (KID) can be uniquely determined depending on the instruction data, they can employ an identical value.

The number of collation status confirmation data given to each area can be changed in correspondence with the numbers of instructions and processing operations for the area.

As mentioned above, it is possible to determine, for each command, whether or not the result of collation be cleared and hence to structure a high system security in a flexible way.

Figure 13:
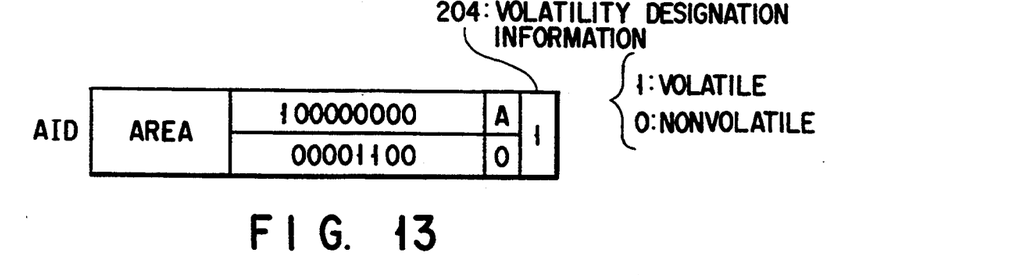
FIG. 13 is another embodiment of identification data for an area of FIG. 7.

It is noted that in steps 93, 109 or 121 that confirm volatility instruction flag 203 corresponding to the instruction code, instead of volatility instruction flag 203, volatility designation information 201 in FIG. 5 or 204 in FIG. 13 can be used. Thus, after the execution of the command (instruction) following the collation of the key data, it is possible to determine, for each key data, whether or not a result of collation be cleared, using volatility designation information 201. Similarly, the volatility designation information 204 can be set for "clear" processing on each area in the data memory as in FIG. 13 and, therefore, identification can be made at a command unit, at an key data unit and at an area unit, ensuring the readier structuring of the system security. In a practical application, as shown in FIG. 13, the volatility information 204 for "clear" processing, as well as the collation status confirmation information and associated logical information are attached to each area and, in this case, it is only necessary to, subsequent to the processing of a given command, clear the collation status storage sections 26 or 27 in the same timing as that shown in FIG. 9F or 9G.

Therefore, a very high security level is ensured for access to each area in the data memory. The result of collation for the key data is not held at all times during a period of a power supply to the IC card. By so doing, it is possible to prevent any unauthorized data access by an unauthorized person during an intervening period of time.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A portable electronic apparatus having a memory section and a control section for controlling access to the memory section from an outside to allow selective inputting/outputting of data, comprising:
    first means for storing at least one first collation information;
    second means for collating the first collation information and second collation information which is inputted from the outside and for providing a result of collation;
    third means for storing the result of collation by the collating means;
    fourth means for storing a first information indicating whether the collation result stored in the third means is to be cleared or not;
    means for performing a given processing in response to an instruction inputted from the outside; and
    means for clearing the collation result stored in the third means after completion of the given processing, when the first information indicates that the collation result is to be cleared.

2. The apparatus according to claim 1, wherein the third means includes a first storing section for storing the collation result when the first information indicates that the collation result is to be cleared and a second storing section for storing the collation result when the first information indicates that the collation result is not be cleared; and
    the clearing means includes means for clearing the collation result stored in the first storing section when the processing is completed.

3. The apparatus according to claim 1, further comprising means for storing a plurality of collation information items, and data items provided for each collation information item to indicate whether the collation result is to be cleared or not, and wherein said clearing means clears the collation result when the data item corresponding to the collated collation information item indicates that the collation result is to be cleared.

4. A portable electronic apparatus having a memory section and a control section for controlling access to the memory section from an outside to allow selective inputting/outputting of data, comprising:
    first means for storing at least one first collation information;
    second means for collating the first collation information and second collation information which is inputted from the outside and for providing a result of collation;
    third means for storing the result of collation by the collating means;
    fourth means for processing an instruction inputted from the outside;
    means, in response to the instruction inputted from the outside, for storing a first information indicating whether the collation result stored in the third means is to be cleared or not; and
    means for clearing the collation result after completion of the processing, when the first information corresponding to the processed instruction indicates that the collation result be cleared.

5. The apparatus according to claim 4, further comprising means, provided in the memory section in a manner to correspond to the instruction, for storing first information indicating whether the collation result stored in the third means is to be cleared or not, wherein the means for storing a first information includes means for determining, based on the first information, a clear of the collation result.

6. The apparatus according to claim 4, wherein the third means includes a first storing section for storing the collation result when the first information indicates that the collation result is to be cleared and a second storing section for storing the collation result when the first information indicates that the collation result is not to be cleared; and
    the clearing means includes means for clearing the collation result stored in the first storing section when the processing is completed.

7. The apparatus according to claim 4, further comprising means for storing a plurality of collation information items, and data items provided for each collation information item to indicates whether the collation result is to be cleared or not, and wherein said clearing means clears the collation result when the data item corresponding to the collated collation information item indicates that the collation result is to be cleared.

8. A portable electronic apparatus having a memory section which includes plurality of memory portions, and a control section for controlling selective access to the memory section from an outside, comprising:

first means for storing at least one first collation information;

second means for collating the first collation information and second collation information inputted from the outside and for providing a result of collation;

third means for storing the result of collation by the collating means;

fourth means, in response to an instruction inputted from the outside, for accessing at least a portion in the memory section;

fifth means for storing a first information corresponding to each memory portion, to indicates whether the collation result stored by the third means is to be cleared or not; and means for clearing the collation result after completion of the accessing, when the first information corresponding to the accessed memory portion indicates the collation result to be cleared.

9. The apparatus according to claim 8, further comprising means, provided for said portion in the memory section, for storing volatility information indicating whether the collation result stored by the third means is to be cleared or not, wherein the fifth means includes means for determining a clear of the collation result based on the volatility information.

10. The apparatus according to claim 8, wherein the third means includes a first storing section for storing the collation result when the first information indicates that the collation result is to be cleared and a second storing section for storing the collation result when the first information indicates that the collation result is not to be cleared; and the clearing means includes means for clearing the collation result stored in the first storing section when the processing is completed.

11. The apparatus according to claim 8, further comprising means for storing a plurality of collation information items, and data items provided for each collation information item to indicates whether the collation result is to be cleared or not, and wherein said clearing means clears the collation result when the data item corresponding to the collated collation information item indicates that the collation result is to be cleared.

* * * * *